(12) United States Patent
Kim et al.

(10) Patent No.: US 11,649,354 B2
(45) Date of Patent: May 16, 2023

(54) POLYIMIDE FILM HAVING IMPROVED THERMAL CONDUCTIVITY AND MANUFACTURING METHOD THEREFOR

(71) Applicant: LG CHEM, LTD., Seoul (KR)

(72) Inventors: Kyunghwan Kim, Daejeon (KR); Hye Won Jeong, Daejeon (KR); Chan Hyo Park, Daejeon (KR); Jinyoung Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 652 days.

(21) Appl. No.: 16/628,206

(22) PCT Filed: Jan. 23, 2019

(86) PCT No.: PCT/KR2019/000940
§ 371 (c)(1),
(2) Date: Jan. 2, 2020

(87) PCT Pub. No.: WO2019/160252
PCT Pub. Date: Aug. 22, 2019

(65) Prior Publication Data
US 2021/0147679 A1 May 20, 2021

(30) Foreign Application Priority Data

Feb. 13, 2018 (KR) .................. 10-2018-0017561
Jan. 2, 2019 (KR) .................. 10-2019-0000095

(51) Int. Cl.
*C08L 79/08* (2006.01)
*C08G 73/10* (2006.01)
*C08J 5/18* (2006.01)
*C08K 5/16* (2006.01)

(52) U.S. Cl.
CPC .......... *C08L 79/08* (2013.01); *C08G 73/1007* (2013.01); *C08G 73/1067* (2013.01); *C08J 5/18* (2013.01); *C08K 5/16* (2013.01); *C08L 2203/16* (2013.01); *C08L 2203/20* (2013.01)

(58) Field of Classification Search
CPC ..... C08L 79/08; C08L 2203/16; C08G 73/10; C08G 73/1067
See application file for complete search history.

(56) References Cited

U.S. PATENT DOCUMENTS

| | | | |
|---|---|---|---|
| 4,906,730 A | 3/1990 | Takekoshi et al. | |
| 5,239,398 A | 8/1993 | Yanagisawa et al. | |
| 5,763,537 A | 6/1998 | Koshimura et al. | |
| 10,815,338 B2 | 10/2020 | Cho et al. | |
| 2013/0240777 A1 | 9/2013 | Yasuda et al. | |
| 2015/0210048 A1* | 7/2015 | Jeong | C03C 17/3405 428/212 |
| 2015/0368402 A1 | 12/2015 | Akinaga et al. | |
| 2017/0283702 A1 | 10/2017 | Kang et al. | |
| 2018/0334541 A1 | 11/2018 | Jeong et al. | |
| 2019/0048143 A1 | 2/2019 | Hong et al. | |

FOREIGN PATENT DOCUMENTS

| | | |
|---|---|---|
| CN | 101805517 A | 8/2010 |
| CN | 104968709 A | 10/2015 |
| EP | 3441420 | 2/2019 |
| JP | H09-087516 A | 3/1997 |
| JP | 2006-274040 A | 10/2006 |
| JP | 2010-235695 A1 | 10/2010 |
| JP | 2010-275394 A | 12/2010 |
| JP | 2011-032430 A | 2/2011 |
| JP | 2011-107518 A1 | 6/2011 |
| JP | 2013-189568 A | 9/2013 |
| JP | 5665846 B2 | 2/2015 |
| JP | 2017-171736 A1 | 9/2017 |
| JP | 2019-502786 A | 1/2019 |
| KR | 10-2005-0106538 A | 11/2005 |
| KR | 10-2011-0099939 A | 9/2011 |
| KR | 10-2014-0122677 A | 10/2014 |
| KR | 2014-0122203 A | 10/2014 |
| KR | 10-2015-0095113 A | 8/2015 |
| KR | 10-2017-0049912 A | 5/2017 |
| KR | 10-2017-0115339 A | 10/2017 |
| WO | 2016-190105 A1 | 12/2016 |

OTHER PUBLICATIONS

European Search Report issued for European Patent Application No. 19 754 784.7 dated May 28, 2020, 8 pages.
ASTEM E1461-13 Standard Test Method for Thermal Diffusivity by the Flash Method, Oct. 1, 2013, XP055695108, 11 pages.
Peciulyte, L., et al., Modification of BPDA-ODA Polyimide Films by Diimides, Composite Interfaces, vol. 17, 2010, 453-465.
International Search Report issued for International Application No. PCT/KR2019/000940 dated May 13, 2019, 4 pages.
Hasegawa, et al., "Structure and Properties of Novel Asymmetric Biphenyl Type Polyimides. Homo- and Copolymers and Blends", Macromolecules, 1999, 32, 387-396.
Okada, et al., "Conformational characterization of imide compounds and polyimides using far-infrared spectroscopy and DFT calculations", Polymer, 86 (2016) 83-90.
Peciulyte, et al. "Modification of BPDA-ODA Polyimide Films by Diimides", Composite Interfaces, 17 (2010) 453-165.

* cited by examiner

*Primary Examiner* — Gregory Listvoyb
(74) *Attorney, Agent, or Firm* — Rothwell, Figg, Ernst & Manbeck, P.C.

(57) ABSTRACT

Provided according to the present invention is a substrate for a flexible display device in which the problems of threshold voltage shift-induced current fluctuation and resultant image sticking can be solved by introducing an imide monomer as an organic filler into a polyamic acid composition to enhance thickness and surface direction densities in the film that is manufactured while vulcanization is performed at high temperatures, thereby enhancing thermal diffusivity and thermal conductivity of the film.

7 Claims, 4 Drawing Sheets

[Fig. 1]
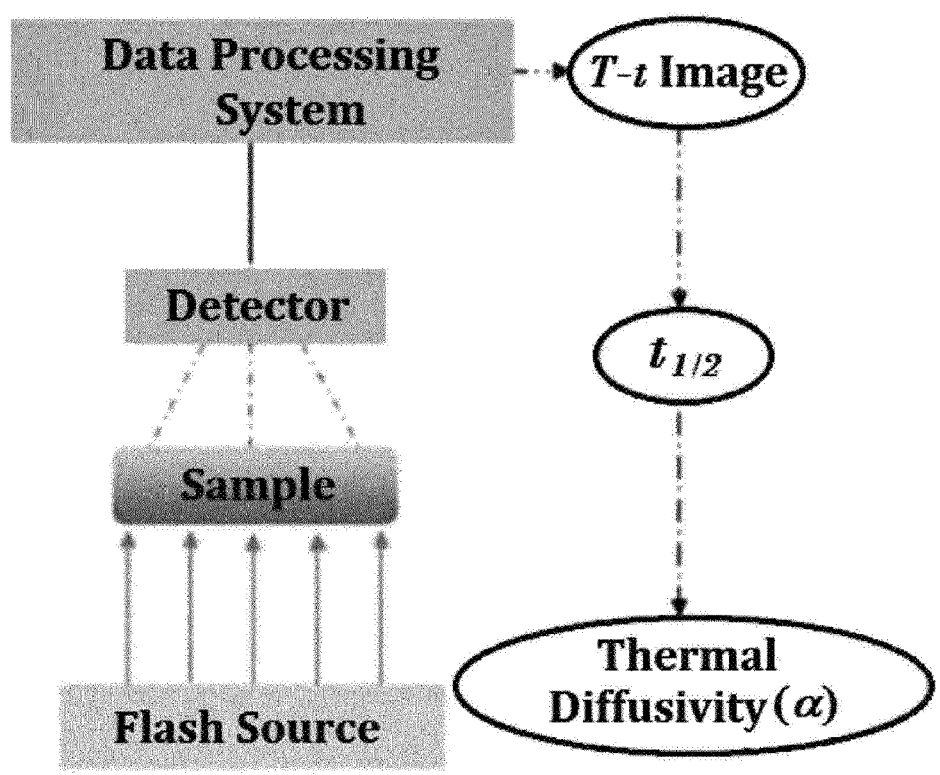

[Fig. 2]
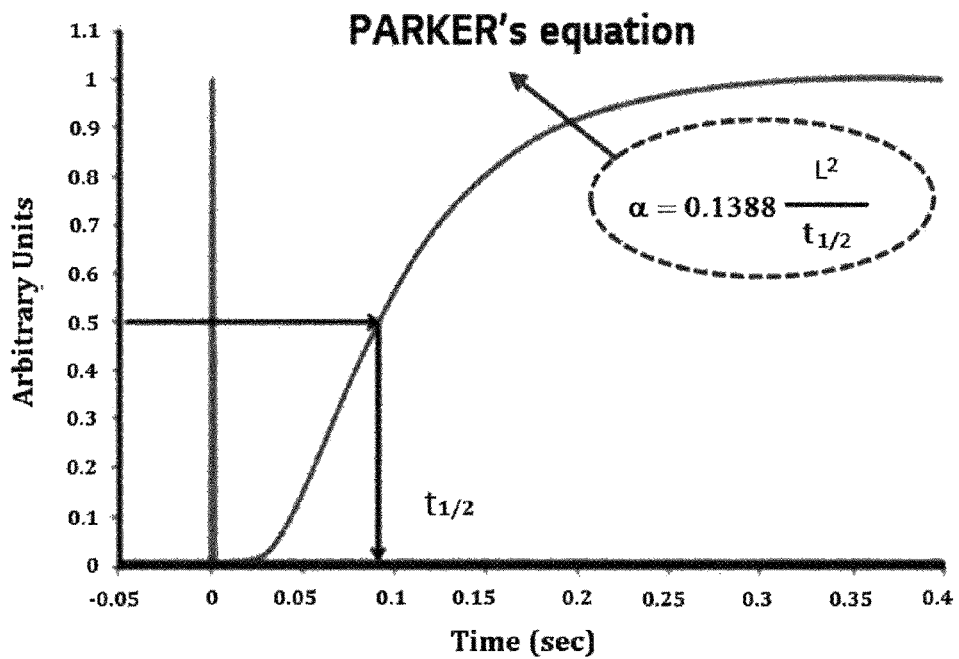
[Fig. 3]
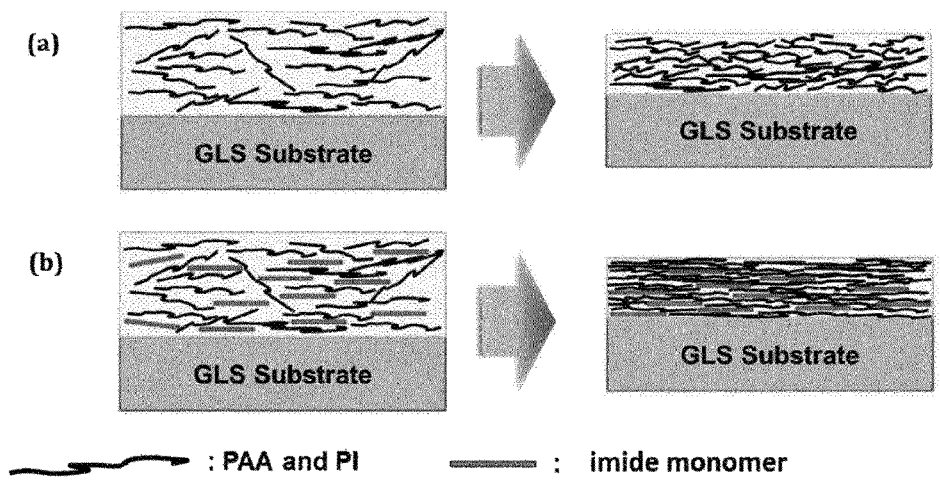

[Fig. 4]
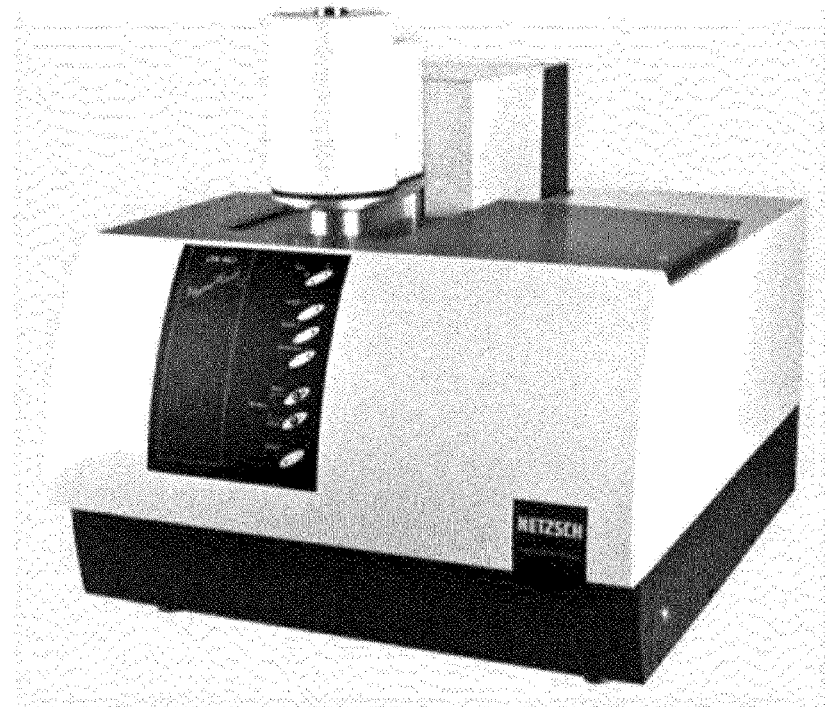

[Fig. 5]
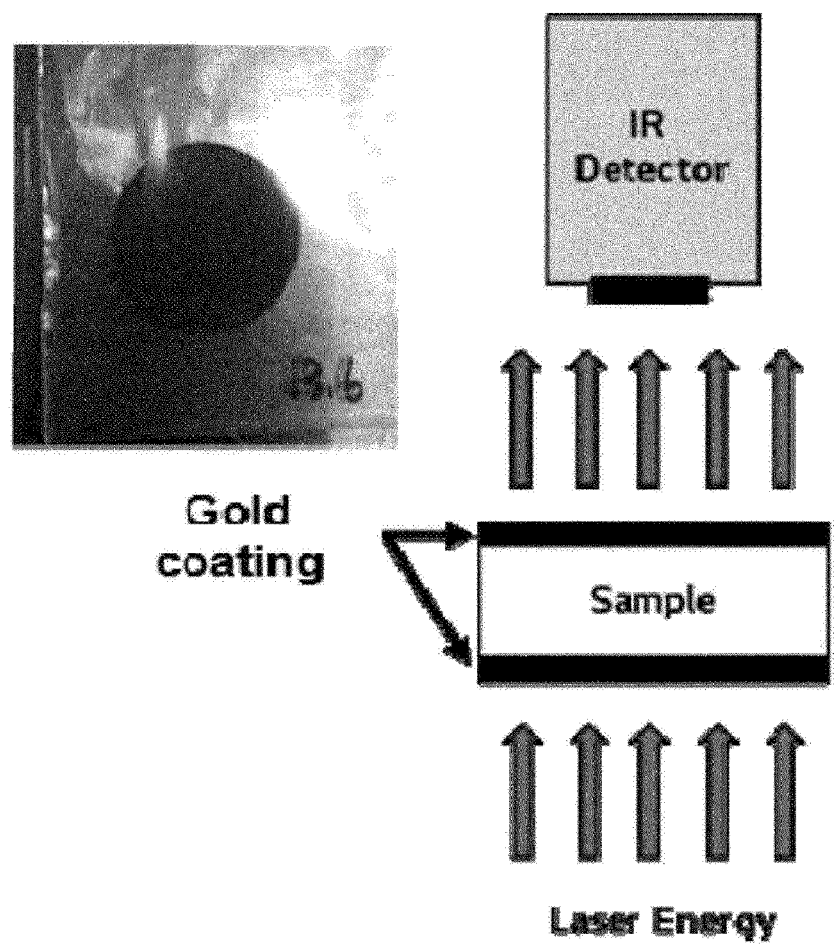

POLYIMIDE FILM HAVING IMPROVED THERMAL CONDUCTIVITY AND MANUFACTURING METHOD THEREFOR

This application is a 35 U.S.C. § 371 National Phase Entry Application from PCT/KR2019/000940, filed on Jan. 23, 2019, and designating the United States, claims the benefit of priorities to Korean Patent Application Nos. 10-2018-0017561, filed on Feb. 13, 2018 and 10-2019-0000095, filed on Jan. 2, 2019, the entire disclosures of which are incorporated herein by reference.

BACKGROUND OF THE INVENTION

1. Field of the Invention

The present invention provides a polyimide film with improved thermal conductivity and a method for producing the same.

2. Description of the Related Art

Polyimide (PI) is a polymer having a relatively low crystallinity or mostly non-crystalline structure, which has an advantage that it is easy to synthesize, can be formed to a thin film and does not require a crosslinking agent for cure. Also, polyimide is a polymeric material that has excellent heat resistance and chemical resistance, and good mechanical properties, electrical properties and dimensional stability due to its rigid chain structure in addition to its transparency. Therefore, it is widely used as electrical and electronic materials for automobiles, aerospace, flexible circuit boards, liquid crystal alignment films for LCDs, and adhesives and coatings.

In particular, polyimide is a high-performance polymer material having high thermal stability, mechanical properties, chemical resistance, and electrical properties and it is increasingly attracting attention as a substrate material for flexible display devices. However, it has to be transparent for use in display applications, and the thermal expansion coefficient must not be negative at a temperature of 350° C. or more in order to lower defects due to the residual stress of the substrate in a heat treatment process for producing displays. Therefore, there are many studies to minimize the change of optical characteristics and thermal history while maintaining the basic characteristics of polyimide.

A flexible display is increasingly in demand in the marketplace due to its free form factor, lightweight and thin features and unbreakable characteristics. In order to realize such a flexible display, polyimide composed of BPDA (3,3',4,4'-biphenyltetracarboxylic dianhydride)-PDA (phenylene diamine) having excellent heat resistance is used.

A flexible display device, for example a TFT device, is fabricated by depositing a multilayer inorganic film such as a buffer layer, an active layer, and a gate insulator on a cured polyimide.

Recently, there is an issue that a polyimide substrate is vulnerable to afterimage, compared to a glass substrate in the implementation of an OLED-type flexible display. The cause of the afterimage is presumed to be the luminance difference which appears according to the different current at the same voltage due to the shift of a threshold voltage ($V_{th}$) in a current driven type OLED display. Here, the threshold voltage ($V_{th}$) is a threshold value of a voltage at which a current begins to flow through a channel, and the threshold voltage is a potential barrier at the time when a state in which no current flows is switched into a state in which current flows.

The inventors of the present invention have studied to solve the afterimage problem and as a result it was found that the shift of $V_{th}$ is further enhanced by the heat generated when the TFT is driven.

SUMMARY OF THE INVENTION

In order to solve the above problems, the present invention provides a polyimide film which enables to improve the heat dissipation characteristics, that is, the thermal conductivity and the thermal diffusivity, thereby alleviating the shift of $V_{th}$.

The present invention also provides a method for producing the polyimide film.

The present invention further provides a flexible display device comprising the polyimide film as a substrate.

In order to solve the above-described problems, the present invention provides a polyimide film comprising an imide monomolecular compound as an organic filler and having 0.2 W/m·K or more of a thermal conductivity (k) as defined by the following equation (1):

Thermal conductivity ($k$)=Specific heat ($C$)×Density ($\rho$)×Thermal diffusivity ($\alpha$)  [Equation 1]

wherein, C, $\rho$ and $\alpha$ represent a specific heat (J/g·K), a density (g/cm$^3$) and a thermal diffusivity (mm$^2$/sec) of the polyimide film, respectively.

According to one embodiment, the imide monomolecular compound may be at least one compound selected from compounds represented by the formula 1 and the formula 2.

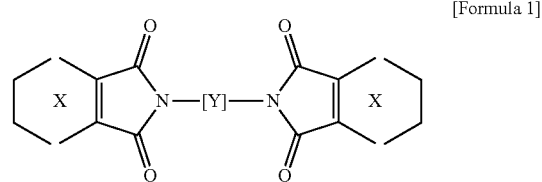

[Formula 1]

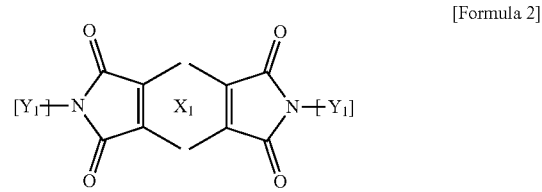

[Formula 2]

wherein, each of X, Y, $X_1$ and $Y_1$ is a monocyclic or polycyclic aromatic ring having 6 to 12 carbon atoms or an organic group having a plurality of monocyclic aromatic rings having 6 to 12 carbon atoms linked to each other.

According to one embodiment, the polyimide film may be prepared by using 3,3',4,4'-biphenylcarboxylic dianhydride (s-BPDA) and 4,4'-paraphenylenediamine (pPDA) as a polymerization component.

According to one embodiment, the compound of the formula 1 or the formula 2 may be a compound of the formula 3 or the formula 4.

[Formula 3]

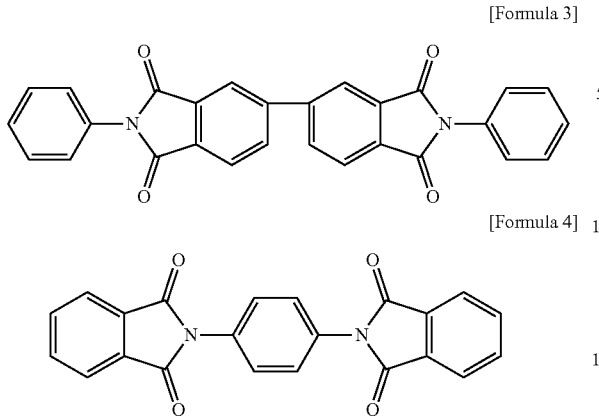

[Formula 4]

According to one embodiment, the molar ratio of the 3,3',4,4'-biphenylcarboxylic dianhydride (s-BPDA) and 4,4'-paraphenylenediamine (pPDA) may be from 0.98:1 to 0.99:1.

According to one embodiment, the polyimide film may have a specific heat of 1.5 J/g·K or more, a density of 1.5 g/cm$^3$ or more, and a thermal diffusivity of 0.07 mm$^2$/sec or more as measured at a thickness of 10 μm.

According to another aspect of the present invention, there is provided a method for producing a polyimide film comprising the steps of:

adding a polymerization component comprising less than 1 mole of 3,3',4,4'-biphenylcarboxylic acid dianhydride (s-BPDA) relative to 1 mole of 4,4'-paraphenylenediamine (pPDA) to a polymerization solvent to produce a polyimide precursor solution;

adding an imide monomolecular compound as an organic filler to the polyimide precursor solution;

applying the polyimide precursor solution onto a substrate; and drying and heating the applied polyimide precursor solution.

According to one embodiment, in the curing process by drying and heating the polyimide precursor solution, the final curing temperature may be 450° C. or higher.

According to one embodiment, the imide monomolecular compound may be at least one selected from the compounds of the formula 1 and the formula 2, and the compound of the formula 1 or the formula 2 may be contained in an amount of 0.1 to 10 wt % based on the total weight of the precursor solution.

According to another aspect of the present invention, there is provided a display device comprising the above-described polyimide film as a substrate.

Effect of the Invention

According to the present invention, by introducing monomers into a polyamic acid composition, which is a polyimide precursor, the density, specific heat, and thermal diffusibility in the plane direction of the polymer can be improved during high temperature curing, thereby improving the thermal conductivity, i.e., heat dissipation of the film. Improvement of the heat dissipation property of the film can alleviate the shift phenomenon of threshold voltage of the current driven type display, thereby greatly improving afterimage characteristics of the display.

BRIEF DESCRIPTION OF THE DRAWINGS

FIGS. 1 and 2 are figures for explaining a method of measuring thermal diffusivity.

FIG. 3 schematically shows polymer behavior upon application on a glass substrate and curing of compositions (a) and (b) according to Comparative Example 1 and Example 1, respectively.

FIG. 4 is a photograph of an apparatus for measuring thermal diffusivity.

FIG. 5 is a photograph of a sample used for measurement of thermal diffusivity.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

The present invention relates to a polyimide film for fabrication of flexible substrate which enables to improve afterimage characteristics of a display by controlling heat dissipation property of a plastic substrate.

In particular, the present invention provides a polyimide film having 0.2 W/m·K or more of a thermal conductivity (k) as defined by the following equation (1):

$$\text{Thermal conductivity } (k) = C \times \rho \times \alpha \qquad \text{[Equation 1]}$$

wherein, C, ρ and α represent a specific heat (J/g·K), a density (g/cm$^3$) and a thermal diffusivity (mm$^2$/sec) of the polyimide film, respectively.

According to a preferred embodiment, the thermal conductivity may be at least 0.25 W/m·K.

The larger is the thermal conductivity of the film, the better is the heat dissipation characteristic. As the heat dissipation property is improved, the current fluctuation due to the shift of the threshold voltage $V_{th}$ is suppressed. Thereby, afterimage characteristics of the display device can be improved.

When the inorganic filler is used for improving the heat dissipation property of the film, the thermal conductivity may be excellent. However, since the inorganic filler has a high affinity to moisture, the VHR (voltage holding ratio) characteristic may be poor due to hygroscopicity of the film.

Accordingly, in order to improve the heat dissipation property of the film, the present invention uses an organic monomolecular compound as an organic filler, not an inorganic filler. As a result, it is possible to obtain a polyimide film having improved thermal conductivity while complementing other physical properties required for a flexible display device.

The thermal conductivity (k) of the polyimide film is obtained from the product of the specific heat, density and thermal diffusivity of the polyimide film.

The specific heat (J/g·K) of the polyimide film can be measured by the DSC method, and the density (g/cm$^3$) can be measured by the Archimedes method.

The thermal diffusivity of the polyimide film can be determined by a laser flash method according to ASTM E1461.

FIGS. 1 and 2 schematically show a method of measuring thermal diffusivity by the flash method. When a heat source of a flash source is irradiated to a film sample having a predetermined thickness, a temperature is detected with a detector over time to obtain a T-t graph as shown in FIG. 2. From the graph, a time $t_{1/2}$ at which T of the T-t graph becomes ½ is obtained and substituted into the equation 2, whereby the thermal diffusivity can be obtained. Equation 2 is the PARKER's equation, which is calculated as a function of thickness and time of the sample, assuming that the sample has no heat loss and is thermally isotropic. In the PARKER's equation of FIG. 2, L is a thickness of the sample, and a is a thermal diffusivity.

According to one embodiment, the polyimide film is obtained by polymerizing and curing a composition comprising a compound represented by the following formula 1 or 2 with 3,3',4,4'-biphenylcarboxylic dianhydride (s-BPDA) and 4,4'-paraphenylenediamine (pPDA) as a polymerization component.

[Formula 1]

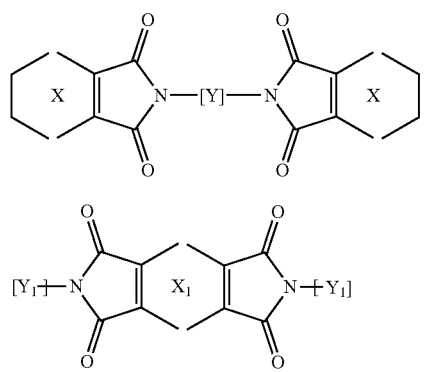

[Formula 2]

wherein, each of X, Y, $X_1$ and $Y_1$ is a monocyclic or polycyclic aromatic ring having 6 to 12 carbon atoms or an organic group having a plurality of monocyclic aromatic rings having 6 to 12 carbon atoms linked to each other.

The monomolecular compound of the formula 1 or 2 can be produced by a method according to the following scheme 1 or 2.

[Scheme 1]

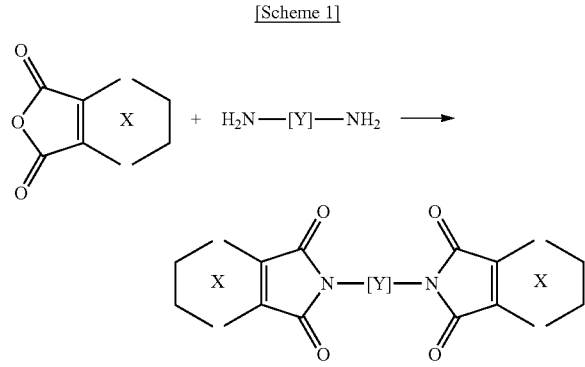

[Scheme 2]

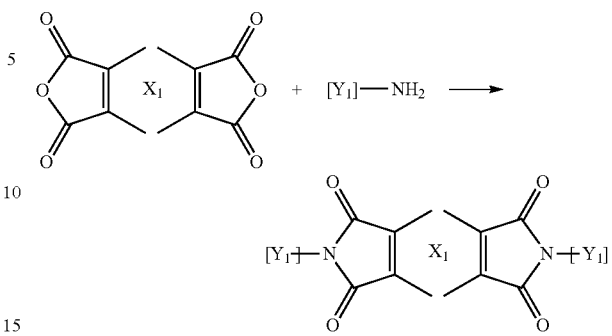

According to a preferred embodiment, the compound of formula 1 or 2 may comprise a compound of formula 3 or 4.

[Formula 3]

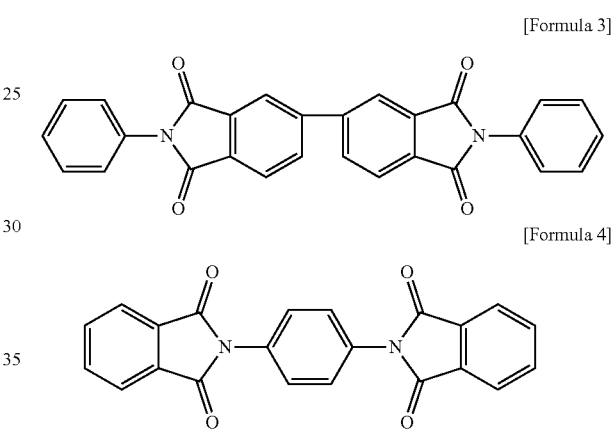

[Formula 4]

According to one embodiment, the molar ratio of the 3,3',4,4'-biphenylcarboxylic dianhydride (s-BPDA) and 4,4'-paraphenylenediamine (pPDA) may be from 0.98:1 to 0.99:1.

According to one embodiment, the polyimide film may have a specific heat of 1.5 J/g·K or more, a density of 1.5 g/cm³ or more, and a thermal diffusivity of 0.07 mm²/sec or more as measured at a thickness of 10 μm. It is more preferred that the specific heat is 1.7 J/g·K or more, the density is 1.7 g/cm³ or more, and the thermal diffusivity is 0.08 mm²/sec or more. These properties allow the thermal conductivity to be improved 2 times or more, preferably 2.5 times or more, as compared with the case where a monomolecular compound is not included.

According to another aspect of the present invention, there is provided a method for producing a polyimide film comprising the steps of:

adding a polymerization component comprising less than 1 mole of 3,3',4,4'-biphenylcarboxylic acid dianhydride (s-BPDA) relative to 1 mole of 4,4'-paraphenylenediamine (pPDA) to a polymerization solvent to produce a polyimide precursor solution;

adding an imide monomolecular compound as an organic filler to the polyimide precursor solution;

applying the polyimide precursor solution onto a substrate; and drying and heating the applied polyimide precursor solution.

According to one embodiment, in the curing process by drying and heating the polyimide precursor solution, the final curing temperature may be 450° C. or higher.

According to one embodiment, the compound of the formula 1 or the formula 2 may be contained in an amount of 5 to 50% by weight, preferably 15 to 25% by weight, based on the total weight of the polyimide precursor solution. If the content of the monomolecular compound is too low, the effect of improving the thermal conductivity of the film is insignificant. If the content of the monomolecular compound is too high, the film forming property may be deteriorated and transparency may be deteriorated.

The composition according to the present invention can enhance the specific heat and the like by introducing the compound of the formula 1 or 2 to improve the thickness and the density in the plane direction of the polymer (PAA, PI) film during high temperature curing.

FIG. 3 shows polymer behaviors upon application on a glass substrate and curing of the composition (a) containing no imide monomolecular compound and the composition (b) containing the imide monomolecular compound according to the present invention. As the polyamic acid is structurally changed to polyimide, the monomolecular compound of the imide structure interacts with the surrounding polymer, which means an increase in $\pi$-$\pi$ interaction, and therefore it contributes to the improvement of the thermal diffusivity and thermal conductivity of the film.

The polyimide film according to the present invention has a positive thermal expansion coefficient at a temperature of 350° C. or higher, more specifically, in the CTE measurement method using TMA, the polyimide film has a positive CTE value at a temperature of 350° C. or higher as measured at the second temperature elevation from 100° C. to 460° C. of the polyimide film that has been cooled after the first temperature elevation. Preferably, it may have a thermal expansion coefficient of 0 ppm/° C. or more and 15 ppm/° C. or less, preferably 0 ppm/° C. or more and 10 ppm/° C. or less.

The polymerization reaction of the polyimide precursor can be carried out according to a usual polymerization method of polyimide precursor such as solution polymerization.

The reaction may be carried out under anhydrous conditions, and the temperature during the polymerization may be −75 to 50° C., preferably 0 to 40° C. The reaction may be carried out in such a manner that the acid dianhydride is added to the solution in which the diamine is dissolved in the organic solvent. The diamine and the acid dianhydride may be contained in an amount of about 10 to 30% by weight in the polymerization solvent, and the molecular weight can be controlled according to the polymerization time and the reaction temperature.

In addition, the organic solvent that can be used in the polymerization reaction may be selected from the group consisting of ketones such as γ-butyrolactone, 1,3-dimethyl-imidazolidinone, methyl ethyl ketone, cyclohexanone, cyclopentanone and 4-hydroxy-4-methyl-2-pentanone; aromatic hydrocarbons such as toluene, xylene and tetramethylbenzene; glycol ethers (Cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether and triethylene glycol monoethyl ether; ethyl acetate, butyl acetate, ethylene glycol monoethyl ether acetate, ethylene glycol monobutyl ether acetate, diethylene glycol monoethyl ether acetate, dipropylene glycol monomethyl ether acetate, ethanol, propanol, ethylene glycol, propylene glycol, carbitol, dimethylacetamide (DMAc), N,N-diethylacetamide, dimethylformamide (DMF), diethylformamide (DEF), N,N-dimethylacetamide (DMAc), N-methylpyrrolidone (NMP), N-ethylpyrrolidone (NEP), 1,3-dimethyl-2-imidazolinone, N,N-dimethylmethoxyacetamide, dimethylsulfoxide, pyridine, dimethylsulfone, hexamethylphosphoramide, tetramethylurea, N-methylcaprolactam, tetrahydrofuran, m-dioxane, p-dioxane, 1,2-dimethoxyethane, bis(2-methoxyethyl)ether, 1,2-bis(2-methoxyethoxy)ethane, bis[2-(2-methoxyethoxy)]ether and a mixture thereof.

Preferably, the organic solvent may include a sulfoxide-based solvent such as dimethyl sulfoxide and diethyl sulfoxide; a formamide-based solvent such as N,N-dimethylformamide and N,N-diethylformamide; an acetamide-based solvent such as N,N-dimethylacetamide and N,N-diethylacetamide; and a pyrrolidone-based solvent such as N-methyl-2-pyrrolidone and N-vinyl-2-pyrrolidone, and these solvent may be used alone or as mixture. However, the organic solvent is not limited thereto. In addition, the organic solvent may further comprise aromatic hydrocarbons such as xylene and toluene.

The method for producing a polyimide film using the polyimide precursor comprises the steps of applying the polyimide precursor composition comprising the polyimide precursor and the organic solvent on one side of the substrate, imidization and curing, and then separating it from the substrate.

Specifically, the polyimide precursor composition may be in the form of a solution dissolved in an organic solvent. In case of the solution form, for example, when polyimide precursor is synthesized in an organic solvent, the polyimide precursor composition may be a solution obtained after the polymerization or may be obtained by adding the same solution, or the polyimide precursor solution obtained after the polymerization may be diluted with another solvent.

The polyimide precursor composition preferably contains a solid content in an amount such that the polyimide precursor composition has an appropriate viscosity in consideration of processability such as coatability in a film forming process. The solid content may be 5 to 20% by weight based on the total weight of the polyimide precursor composition. Alternatively, it may be preferred that the polyimide precursor composition is adjusted to have a viscosity of 400 to 50,000 cP. The viscosity of the polyimide precursor composition may be less than 400 cP. If the viscosity of the polyimide precursor composition is more than 50,000 cP, flowability of the display substrate using the polyimide precursor composition may be reduced, causing problems in the manufacturing process such as not uneven coating during coating process.

Next, the polyimide film can be produced by applying the polyimide precursor composition prepared above to one surface of the substrate, thermally imidizing and curing the polyimide precursor composition at a temperature of 80° C. to 500° C., and then separating from the substrate.

In this case, the substrate may be glass, metal substrate, plastic substrate, or the like without any particular limitation. Among these, a glass substrate may be preferable because it is excellent in thermal and chemical stability during imidization and curing process of the polyimide precursor, and can be easily separated without damage to the formed polyimide-based film after curing.

The coating process can be carried out according to a usual coating method. Specifically, a spin coating method, a bar coating method, a roll coating method, an air-knife method, a gravure method, a reverse roll method, a kiss roll method, a doctor blade method, a spray method, a dipping method, a brushing method, or the like may be used. Of these, it is more preferable to carry out by a casting method capable of continuous process and capable of increasing the imidization rate of polyimide.

The polyimide precursor composition may also be applied on the substrate to a thickness range such that the polyimide film to be finally prepared has a thickness suitable for the display substrate.

Specifically, it may be applied in an amount such that the thickness is 10 to 30 μm. After the application of the polyimide precursor composition, a drying process for removing the solvent present in the polyimide precursor composition may be further optionally performed, prior to the curing process.

The drying process may be carried out according to a conventional method, specifically at a temperature of 140° C. or lower, or 80° C. to 140° C. If the drying temperature is lower than 80° C., the drying process becomes longer. If the drying temperature is higher than 140° C., the imidization rapidly proceeds to make it difficult to form a polyimide film having a uniform thickness.

Then, the curing process may be carried out by heat treatment at a temperature of 80° C. to 500° C. The curing process may be carried out by a multi-stage heat treatment at various temperatures within the above-mentioned temperature range. The curing time in the curing step is not particularly limited and may be, for example, 3 to 60 minutes.

Further, a subsequent heat treatment process may be further optionally performed to increase the imidization ratio of the polyimide in the polyimide film after the curing step, thereby forming the polyimide-based film having the above-mentioned physical properties.

The subsequent heat treatment process is preferably performed at 200° C. or higher, or 200° C. to 500° C. for 1 minute to 30 minutes. The subsequent heat treatment process may be performed once or in a multi stage such as two or more stages. Specifically, it may be carried out in three stages including a first heat treatment at 200 to 220° C., a second heat treatment at 300 to 380° C., and a third heat treatment at 400 to 500° C. It is preferable to cure in a condition that the final curing temperature is 450° C. or higher for 30 minutes or more.

Thereafter, the polyimide film may be manufactured by peeling the polyimide film formed on the substrate from the substrate by a conventional method.

The polyimide according to the present invention may have a glass transition temperature of about 360° C. or higher. Since the polyimide has such excellent heat resistance, the film containing the polyimide can maintain excellent heat resistance and mechanical properties against high-temperature heat added during the device manufacturing process.

The polyimide film according to the present invention may have a thermal decomposition temperature (Td 1%), which indicates a mass reduction of 1%, may be 550° C. or higher.

The polyimide film according to the present invention has excellent mechanical properties. For example, an elongation may be 10% or more, preferably 20% or more, and a tensile strength may be 400 MPa or more, preferably 450 MPa or more, more preferably 500 MPa or more, and a tensile modulus may be 10 GPa or more.

The polyimide according to the present invention can be used as a substrate for a device, a cover substrate for a display, an optical film, an IC (integrated circuit) package, an adhesive film, a multilayer flexible printed circuit (FPC), a tape, a touch panel, a protective film for optical discs, and the like.

The present invention provides a flexible display device comprising the polyimide film. For example, the display device includes a liquid crystal display device (LCD), an organic light emitting diode (OLED), or the like, particularly it is suitable for an OLED device using a low temperature polycrystalline silicon (LTPS) which requires a high temperature process, but is not limited thereto.

Hereinafter, embodiments of the present invention will be described in detail so that those skilled in the art can easily carry out the present invention. The present invention may, however, be embodied in many different forms and should not be construed as limited to the embodiments set forth herein.

Preparation Example 1 Synthesis of a Compound of Formula 3

80 g of an organic solvent, NMP (N-methyl-2-pyrrolidone) was charged into a reactor equipped with a stirrer in a nitrogen stream, and then 18.99 g (0.204 mol) of aniline was dissolved while maintaining the reactor temperature at 25° C. To the aniline solution, 30.0 g (0.102 mol) of 3,3',4,4'-biphenylcarboxylic dianhydride (s-BPDA) and 93.7 g of NMP were added at the same temperature and dissolved and stirred for a predetermined time to synthesize a compound of formula 3.

[Formula 3]

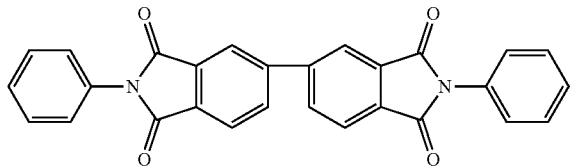

Example 1 Polymerization of Polyimide of BPDA-pPDA/Compound of Formula 3 (98.9:100:2.2)

100 g of an organic solvent, NMP (N-methyl-2-pyrrolidone) was charged into a reactor equipped with a stirrer in a nitrogen stream, and then 6.192 g (57.259 mmol) of paraphenylene diamine (p-PDA) was dissolved while maintaining the reactor temperature at 25° C. To the p-PDA solution, 16.661 g (56.629 mmol) of 3,3',4,4'-biphenylcarboxylic dianhydride (s-BPDA) and 56.96 g of NMP were added at the same temperature and dissolved with stirring for a predetermined time to synthesize a polyamic acid.

Then, 2 wt % of the compound of formula (3) prepared in Preparation Example 1 was added to the polyamic acid solution and stirred for a predetermined time to prepare a polyimide composition.

The organic solvent was added in such as amount that the solid concentration of the polyimide precursor solution prepared from the reaction is 12.8 wt % to prepare a polyimide precursor solution.

The polyimide precursor solution was spin-coated on a glass substrate. The glass substrate coated with the polyimide precursor solution was placed in an oven, heated at a rate of 6° C./min, and cured at 120° C. for 10 minutes and at 460° C. for 55 minutes. After completion of the curing process, the glass substrate was immersed in water and the film formed on the glass substrate was peeled off and dried at 100° C. in the oven to prepare a polyimide film having a thickness of 10 μm.

Example 2 Polymerization of Polyimide of BPDA-pPDA/Compound of Formula 4 (98.9:100:2.2)

A polyimide film having a thickness of 10 μm was prepared in the same manner as in Example 1, except that the compound of formula (4) was used.

Comparative Example 1 Polymerization of Polyimide of BPDA-pPDA (98.9:100)

100 g of an organic solvent, NMP (N-methyl-2-pyrrolidone) was charged into a reactor equipped with a stirrer in a nitrogen stream, and then 6.243 g (57.726 mmol) of paraphenylene diamine (p-PDA) was dissolved while maintaining the reactor temperature at 25° C. To the p-PDA solution, 16.797 g (57.091 mmol) of 3,3',4,4'-biphenylcarboxylic dianhydride (s-BPDA) and 56.96 g of NMP were added at the same temperature and dissolved with stirring for a predetermined time to prepare a polyimide precursor.

The organic solvent was added in such an amount that the solid concentration of the polyimide precursor prepared from the reaction is 12.8 wt % to prepare a polyimide precursor solution.

The polyimide precursor solution was spin-coated on a glass substrate. The glass substrate coated with the polyimide precursor solution was placed in an oven, heated at a rate of 6° C./min, and cured at 120° C. for 10 minutes and at 460° C. for 55 minutes. After completion of the curing process, the glass substrate was immersed in water and the film formed on the glass substrate was peeled off and dried at 100° C. in the oven to prepare a polyimide film having a thickness of 10 μm.

Experimental Example 1

A thermal decomposition temperature (Td1%), transmittance, thermal diffusivity and thermal conductivity of each of the polyimide films prepared above were measured in the following manner and are shown in Table 1.

<Measurement of Thermal Decomposition Temperature>

A thermal decomposition temperature, which indicates the temperature at which 1% weight loss occurs from the initial weight (100%), is evaluated in a nitrogen atmosphere in the range of 30° C. to 700° C. using Discovery TGA of TA instruments.

⊚: Td 1% 565° C. or more
○: Td 1% 545~564° C.
X: Td 1% 545° C. or less

<Transmittance>

A transmittance was measured according to JIS K 7105 using a transmittance meter (Model 8453 UV-visible Spectrophotometer, manufactured by Agilent Technologies) and the average of transmittance at a wavelength of 380 to 780 nm was measured.

⊚: 60% or more
○: 50%~60%
X: 50% or less

<Specific Heat and Density>

A specific heat (J/g·K) of the polyimide film was measured by the DSC method, and a density (g/cm$^3$) was measured by the Archimedes method.

<Thermal Diffusivity>

A thermal diffusivity was measured using an LFA 467 apparatus of NETZSCH shown in FIG. 4. The sample was prepared by cutting a film into a square having a size of 10 mm×12.7 mm and gold was deposited on both sides of the sample to a thickness of 250 nm to 500 nm as shown in FIG. 5.

<Thermal Conductivity>

Thermal conductivity was calculated according to the following equation 1.

Thermal conductivity ( )=Specific heat (C)×Density (ρ)×Thermal diffusivity (α)  [Equation 1]

Table 1 shows Td1%, transmittance, thermal diffusivity, density, specific heat and thermal conductivity of the polyimide film prepared in Example 1 and Comparative Example.

TABLE 1

| Item | Comparative Example 1 | Example 1 |
|---|---|---|
| Film thickness (μm) | 10 | 10 |
| Td 1% | ⊚ | ⊚ |
| Transmittance | ⊚ | ⊚ |
| Thermal diffusivity (mm$^2$/s) | 0.059 | 0.090 |
| Specific heat C (J/g · K) | 1.232 | 1.744 |
| Density ρ (g/cm$^3$) | 1.35 | 1.79 |
| Thermal conductivity k (W/m · K) | 0.098 | 0.282 |

As shown in the results of Table 1, the specific heat, density and thermal diffusivity of the polyimide film prepared by adding the monomolecular compound of formula 3 were improved while maintaining the thermal decomposition characteristics and transmittance. As a result, the thermal conductivity increased 2.8 times as compared with that in Comparative Example. Therefore, the polyimide film according to the present invention can suppress the afterimage problem because current fluctuation due to the shift of the threshold voltage can be suppressed due to excellent heat radiation characteristics.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A polyimide film comprising an imide monomolecular compound as an organic filler and a polymerized and cured product of 3,3',4,4'-biphenylcarboxylic dianhydride (s-BPDA) and 4,4'-paraphenylenediamine (pPDA),
wherein the polyimide film has a thermal conductivity (k) of 0.2 W/m·K or more as defined by Equation 1:

Thermal conductivity (k)=C×ρ×α  [Equation 1]

wherein, C, ρ and α represent a specific heat (J/g·K), a density (g/cm$^3$) and a thermal diffusivity (mm$^2$/sec) of the polyimide film, respectively, and wherein the imide monomolecular compound is a compound of Formula 4

[Formula 4]

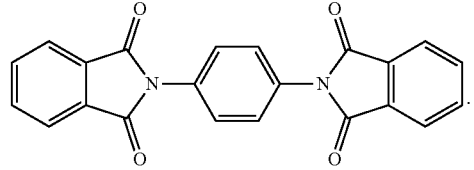

2. The polyimide film according to claim 1, wherein a molar ratio of the 3,3',4,4'-biphenylcarboxylic dianhydride (s-BPDA) and 4,4'-paraphenylenediamine (pPDA) is 0.98:1 to 0.99:1.

3. The polyimide film according to claim 1, wherein the polyimide film has a specific heat of 1.5 J/g·K or more, a density of 1.5 g/cm$^3$ or more, and a thermal diffusivity of 0.07 mm$^2$/sec or more as measured at a film thickness of 10 μm.

4. A method for producing a polyimide film comprising the steps of:
   adding a polymerization component comprising less than 1 mole of 3,3',4,4'-biphenylcarboxylic acid dianhydride (s-BPDA) relative to 1 mole of 4,4'-paraphenylenediamine (pPDA) to a polymerization solvent to produce a polyimide precursor solution;
   adding an imide monomolecular compound as an organic filler to the polyimide precursor solution;
   applying the polyimide precursor solution onto a substrate; and
   drying and heating the applied polyimide precursor solution,
   wherein the imide monomolecular compound is a compound of Formula 4

[Formula 4]

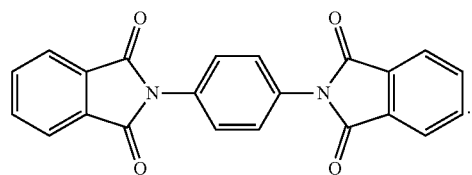

5. The method for producing a polyimide film according to claim 4, wherein the imide monomolecular compound is contained in an amount of 0.1 to 10 wt % based on the total weight of the polyimide precursor solution.

6. The method for producing a polyimide film according to claim 4, further comprising a subsequent heating treatment comprising a final heating at 450° C. or higher.

7. A display device comprising the polyimide film according to claim 1 as a substrate of the display device.

* * * * *